United States Patent
Petolino, Jr. et al.

[11] Patent Number: 5,898,852
[45] Date of Patent: Apr. 27, 1999

[54] LOAD INSTRUCTION STEERING IN A DUAL DATA CACHE MICROARCHITECTURE

[75] Inventors: Joseph Anthony Petolino, Jr., Palo Alto; William Lee Lynch, La Honda; Gary Raymond Lauterbach, Los Altos; Kalon S. Holdbrook, Cupertino, all of Calif.

[73] Assignee: Sun Microsystems, Inc., Palo Alto, Calif.

[21] Appl. No.: 08/883,639

[22] Filed: Jun. 26, 1997

[51] Int. Cl.$^6$ ........................................ G06F 9/06
[52] U.S. Cl. ............................. 395/390; 395/391
[58] Field of Search ................... 395/390, 391; 711/119, 123, 137, 140

[56] References Cited

U.S. PATENT DOCUMENTS

| | | | |
|---|---|---|---|
| 4,777,594 | 10/1988 | Jones et al. .............................. | 395/587 |
| 4,980,823 | 12/1990 | Liu .......................................... | 711/137 |
| 5,276,821 | 1/1994 | Imai et al. ............................... | 395/390 |
| 5,287,466 | 2/1994 | Kodama ................................... | 395/391 |
| 5,742,783 | 4/1998 | Azmoudch ............................... | 395/391 |
| 5,784,711 | 7/1998 | Chi ........................................... | 711/123 |

*Primary Examiner*—William M. Treat
*Attorney, Agent, or Firm*—Townsend and Townsend and Crew LLP

[57] ABSTRACT

An apparatus for executing an instruction is provided. The instruction loads data into one of a plurality of registers in a register file and is in a first group of instructions. A second group of instructions is executed sequentially after the first group of instructions. The first and second groups of instructions should each include at least one instruction. The apparatus includes a first memory, a second memory, a first functional unit coupled to the first memory, and a second functional unit coupled to the first memory and to the second memory. The first and second functional units are both capable of executing the instruction. Also included is an instruction issue unit coupled to the first and the second functional units. The instruction issue unit issues the instruction to a selected functional unit selected from one of the first and the second functional units. This selection is based on a load prediction bit associated with the instruction.

20 Claims, 2 Drawing Sheets

LOAD INSTRUCTION STEERING IN A DUAL DATA CACHE MICROARCHITECTURE

CROSS-REFERENCE TO RELATED APPLICATIONS

This application is related to U.S. patent application Ser. No. 08/883,416, filed Jun. 26, 1997, entitled "LATENCY PREDICTION IN A PIPELINED MICROARCHITECTURE," having Joseph Anthony Petolino, William Lee Lynch, Gary Raymond Lauterbach, and Chitresh Chandra Narasimhaiah as inventors. This application is also assigned to Sun Microsystems, Inc., the assignee of the present invention, and is hereby incorporated by reference.

BACKGROUND OF THE INVENTION

The present invention relates to a method and apparatus for processing instructions in a computer. More specifically, the present invention relates to a method and apparatus for dynamically determining which of two or more caches contain load data and issuing the given load instruction to a functional unit coupled thereto.

Pipelining is an implementation technique whereby multiple instructions are overlapped in execution. A pipeline (also known as a functional unit) completes each instruction in a series of steps called pipeline stages. Instructions "enter" at one end of the pipeline, are processed through the stages, and "exit" at the other end (i.e., their intended effects are carried out). The throughput of the pipeline is determined by how often instructions are completed in the pipeline. The time required to move an instruction one step down the pipeline is known as a machine cycle. The length of a machine cycle is determined by the time required by the slowest pipeline stage because all the stages must proceed at the same time.

In this type of architecture, as in most, the chief means of increasing throughput is by reducing the duration of the clock cycle. Alternatively, systems may employ multiple pipelines to increase throughput, issuing instructions using a scheduler or similar hardware construct. Instructions may be issued to the pipelines based on numerous factors, such as pipeline availability, op-code type, operand availability, data dependencies, and other factors. Such architectures require instructions and data to be provided at extremely high rates to maintain a high level of utilization for the microprocessor's execution unit(s). To maintain these high data rates, designers commonly employ cache memories.

Cache memory exploits the "principle of locality," which holds that all programs favor a portion of their address space at any instant in time. This hypothesis has two dimensions. First, locality can be viewed in time (temporal locality), meaning that if an item is referenced, it will tend to be referenced again soon. Second, locality can be viewed as locality in space (spacial locality), meaning that if an item is referenced, nearby items will also tend to be referenced.

Another architectural feature implemented in some of today's microprocessor architectures is the use of multiple caches. Commonly, a delineation is made between the caching of instructions and data. Recently, specialized data caches have been included in certain microprocessor architectures to allow for the storage of certain information related on the basis of various characteristics, such as repetitive use in floating point or graphics calculations.

When used in combination with multiple pipelines, which too may be specialized, it is desirable to group instructions on the basis of the ability to execute each instruction in a group simultaneously. By grouping instructions, such an architecture insures maximum utilization of its facilities (e.g., pipelines) and so maximizes throughput.

What is often required in such microprocessor architectures is the ability to dynamically allocate instructions to functional units for the instructions' subsequent execution. For example, when two instructions are to read information from two caches simultaneously (i.e., the caches are accessed within the same time slice), each instruction must be allocated to a particular functional unit (i.e., pipeline) having the requisite facilities for execution.

Preferably this allocation is performed in such a way as to maximize the number of instructions per group. Each group should therefore contain a maximum number of simultaneously executable instructions, thereby insuring the maximum utilization of the microprocessor's facilities. Because the allocation must be done dynamically (i.e., as the program executes), it must not require any significant processing between the time that the instruction is fetched and when it is issued to a functional unit.

SUMMARY OF THE INVENTION

The present invention solves the problems associated with the prior art by providing an architectural construct which permits the prediction of whether data loaded by a load instruction will be found in one of two (or more) caches, with an acceptable degree of certainty.

One aspect of the present invention associates a load prediction bit (LPB) with each instruction stored in a memory unit. The LPB indicates a likely location of data among a number of memory units capable of storing such data. The load prediction bit is used by an instruction issue unit to assign the instruction to one of a number of functional units (i.e., pipelines) coupled to the memory units. Preferably, the instruction is assigned based on (1) which functional unit(s) have access to the memory unit in which the data is predicted to be, and (2) the ability to maximize functional unit usage by avoiding the use of a functional unit required for the execution of another instruction.

In particular, the present invention can be used to improve the performance of a microarchitecture having dual data caches. For example, a dual-cache microarchitecture might include a data cache, which loads data on demand, and prefetch cache, which prefetches data under hardware or software control. An instruction cache having entries for instructions and associated LPB's might also be provided. The instructions would be executed in either a first functional unit, having access to only the prefetch cache, and a second functional unit, having access to both caches. The LPB associated with that instruction is thus used to select the functional unit in which the instruction should be executed. The instruction is capable of retrieving data from either the prefetch or data cache using either of the first or second functional units.

The method of the present invention first determines if the instruction is of a particular instruction type. If the instruction is of the particular instruction type, the load prediction bit is examined. If the load prediction bit is set, the instruction is executed in the first functional unit, gaining access to the prefetch cache. If the data is not stored in the prefetch cache, the instruction is recirculated (or re-fetched) and issued to the second functional unit for execution therein. The second functional :o unit is coupled to the data cache and, due to its architecture (i.e., the inclusion of a TLB, among other constructs), is also capable of accessing external memory.

However, if the load prediction bit is cleared, the instruction is executed in the second functional unit. If it is subsequently determined that the data is likely to be stored in the prefetch cache and not in the data cache, and the processor can take advantage of this situation to improve utilization of the functional units, the load prediction bit is set. Otherwise, the load prediction bit is cleared.

A further understanding of the nature and advantages of the present invention may be realized by reference to the remaining portions of the specification and the drawings.

DETAILED DESCRIPTION

An Exemplary Microarchitecture of the Present Invention

Figure 1:
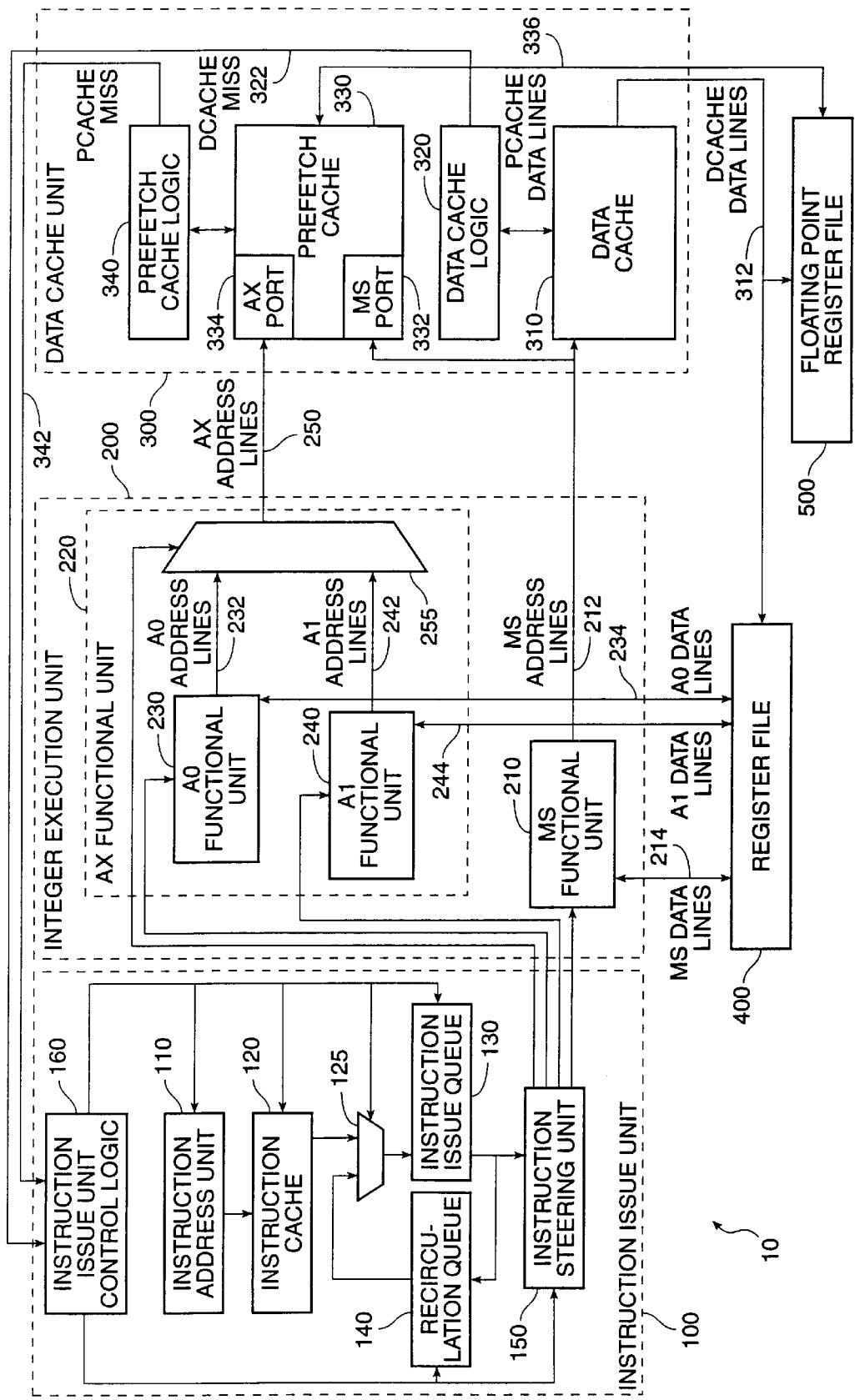
FIG. 1 is a block diagram showing a microarchitecture including architectural constructs according to the present invention.

FIG. 1 illustrates an exemplary microarchitecture 10 according to the present invention, which includes an instruction issue unit 100, an integer execution unit 200, a data cache unit 300, a register file 400, and a floating point register file 500. However, only a subset of the possible structures and data paths microarchitecture 10 might contain are shown in FIG. 1. A fully functional microarchitecture would likely contain additional functional units, data paths, glue logic, and similar architectural constructs. For example, instruction issue unit 100 might contain multiple instruction caches; a floating point unit might be included, as might a graphics unit. The partial microarchitecture shown in FIG. 1 is only for illustrative purposes and is intended only to provide one possible framework in which the method and an apparatus of the present invention might be practiced.

Instruction issue unit 100 includes an instruction address unit 110, an instruction cache 120, a multiplexer 125, an instruction issue queue 130, a recirculation queue 140, and an instruction steering unit 150. These elements are controlled by instruction issue unit control logic 160. Integer execution unit 200 includes three functional units (i.e., pipelines) and their associated logic. The first of these is a memory/special (MS) functional unit 210, which accesses data cache unit 300 by sending addresses to data cache unit 300 over MS address lines 212. MS functional unit 210 reads data from and writes data to register file 400 via MS data lines 214. An AX functional unit 220 is also illustrated as an element of integer execution unit 200.

AX functional unit 220 actually includes two functional units. The first of these, an A0 functional unit 230, communicates addresses to data cache unit 300 via address lines 232 and communicates data to and from register file 400 over A0 data lines 234. In a similar manner, an A1 functional unit 240 communicates addresses to data cache unit 300 via address lines 242 and communicates data to and from register file 400 over A1 data lines 244. Only a single set of address lines are supported between AX functional unit 220 and data cache unit 300. Thus, A0 address lines 232 and A1 address lines 242 are coupled to a multiplexer 255, which selects between the two sets of address lines and is controlled by instruction steering unit 150.

Data cache unit 300 is shown as including two data caches, although other architectural constructs might be included therein. A data cache (DCache) 310 is provided to cache data on an as-needed basis (i.e., data cache 310 is an on-demand cache) and receives control signals from data cache logic 320. Data cache 310 receives MS address lines 212 from MS functional unit 210, and communicates data to and from register file 400 via DCache data lines 312. Data cache 310 communicates with and is controlled by data cache logic 320. Data cache logic 320 communicates the occurrence of a cache miss (or, conversely, a cache hit) in data cache 310 to instruction issue control logic 160 via DCache miss signal 322.

A prefetch cache (PCache) 330 is also provided as part of data cache unit 300. Prefetch cache 330 is accessed in the same manner as other caches, but differs in the way data is stored therein. Data cache entries, such as those of data cache 310, are filled on an "as-needed" basis, so that a cache line is filled when a cache miss occurs. Some caches also provide limited pre-fetching, using buffers or the like, under hardware control.

However, unlike data cache 310, data is loaded into prefetch cache 330 under either hardware or software control. Data may be speculatively loaded into prefetch cache 330 under hardware control, in a fashion similar to that of data cache 310. Under software control, data can be cached in prefetch cache for one or more reads, or can wait for the requisite data to be cached in an external cache coupled to microarchitecture 10 (i.e., wait for the data to be written to the external cache). This might be done by a compiler, for example, having information that certain data may be needed for repetitive floating point operations, such as matrix or graphics computations.

Prefetch cache 330 also differs from data cache 310 in that prefetch cache 330 supports accesses by both MS functional unit 210 and AX functional unit 220. MS functional unit 210 accesses an MS port 332 of prefetch cache 330 via MS address lines 212. MS functional unit 210 accesses both caches by presenting the data address to each cache simultaneously. AX functional unit 220 communicates with prefetch cache 330 via AX address lines 250, which are connected to an AX port 334. Prefetch cache 330 communicates data to floating point register file 500 via PCache data lines 336. Prefetch cache 330 is controlled by prefetch cache logic 340 which communicates cache misses (or, conversely, cache hits) in prefetch cache 330 to instruction issue unit control logic 160 via PCache miss signal 342.

In operation, microarchitecture 10 is capable of executing many different kinds of instructions. The 0 instructions microarchitecture 10 is capable of executing make up the microarchitecture's instruction set. However, the following discussion of the microarchitecture's operation will be limited to the execution of instructions which are benefitted by the present invention. During the execution of any instruction set, an initial step is to fetch the instruction to be executed from the location in which it is stored. In microarchitecture 10, this step is performed by the generation of an instruction address by instruction address unit 110. The instruction's address is communicated to instruction cache 120 which supplies the addressed instruction to a multiplexer 125. This assumes that the instruction to be executed resides in instruction cache 120. If such is not the case, the required instruction may be fetched from external memory such as a second-level cache or main memory (not shown).

The instruction to be executed is then passed through multiplexer 125 to instruction issue queue 130. Instruction issue queue 130 may be of any depth appropriate to the microarchitecture employed, but the queue's depth will likely be based on the number of stages in the functional units (i.e., pipelines) prior to the pipeline stage at which instructions are dispatched. Instruction issue queue 130 issues the instruction to be executed to both instruction steering unit 150 and recirculation queue 140.

Recirculation queue 140 serves to temporarily store the fetched instructions and maintains their order to provide for the case where an instruction must be canceled from the pipeline to which it is issued. In microarchitecture 10, not only is the given instruction canceled, but instructions younger than the canceled instruction may need to be canceled as well. The canceled instructions must then be re-issued and re-issued. This is done by transferring the proper instructions from recirculation queue 140 to instruction issue queue 130.

The instructions issued to instruction steering unit 150 are then issued to one of the functional units. Instruction steering unit 150 evaluates the resource requirements of the instructions available for issue, in conjunction with the currently-available functional unit resources, allocates those resources, and steers the instructions to the staging areas of the corresponding functional units for subsequent execution. In part, this determination is based on the instruction and, possibly, associated informational bits. These informational bits (also known as pre-decode bits) are used to indicate the functional units in which a given instruction may be executed. The selection of acceptable functional units for each instruction is determined during the design of the instruction set and microarchitecture, and is based on the resources required by the given instruction (e.g., access to the translation lookaside buffer (TLB) in data cache unit 300 (not shown), access to data cache 310, access to other functional units, and similar criteria).

In performing the steering function, instruction steering unit 150 also groups instructions together because each functional unit is capable of executing one (or more) instructions in a group in any given time slice. Thus, instructions grouped together will be executed in a single time slice. For example, the instruction stream of Table 1 represents an exemplary segment of assembly code that might be encountered while running a software program:

TABLE 1

Exemplary assembly code segment.

| Instruction | Functional Unit | Group | Meaning |
| --- | --- | --- | --- |
| ADD | A0 | 1 | Add two operands |
| SUB | A1 | 1 | Subtract operands |
| XOR | A0 | 2 | Exclusive-or two operands |
| LDI | MS | 2 | Load integer value |
| LDF | MS | 3 | Load floating point value |
| STO | MS | 4 | Store value |

Assuming that all functional units are available at the start of this code segment, AX functional unit 220 is filled by the first two instructions (ADD and SUB). Because the third instruction (XOR) must use either A0 functional unit 230 or A1 functional unit 240, the first two instructions constitute a group and are thus executed in parallel as group 1. Because the fourth instruction (LDI) can execute in MS functional unit 210, but the fifth instruction (LDF) must also use that functional unit, the third and fourth instructions are grouped together as group 2. Because the sixth instruction (STO) must also use MS functional unit 210, the fifth instruction (LDF) is alone in its group, group 3. The sixth instruction (STO) is shown as being in group 4, which may include other subsequent instructions not shown. This example assumes that no data dependencies exist between the operands of the listed instructions.

The fundamental precept for grouping instructions, then, is that no two instructions in a group may require the use of the same functional unit (this is a physical impossibility in microarchitecture 10) during a single time slice. Instruction steering unit 150 thus issues groups of instructions to the functional units (i.e., pipelines) of microarchitecture 10 such that as many functional units as possible are utilized in any one time slice. The maximum number of instructions in a group is three, because there are three functional units and each can execute no more than one instruction in a time slice. With more functional units, greater parallelism could be achieved. For purposes of this discussion, however, the instruction to be executed will be assumed to be executed in one of the functional units shown as part of integer execution unit 200.

If instruction steering unit 150 selects MS functional unit 210 to execute the given instruction, that instruction enters MS functional unit 210 and is executed therein. The instruction might be, for example, a load floating point (LDF) instruction, which loads data representing a floating point value into floating point register file 500. MS functional unit 210 executes an LDF instruction by accessing both data cache 310 and prefetch cache 330 via MS address lines 212. These caches are accessed prior to accessing external memory because of the rapidity with which these caches provide data, thus improving system throughput.

At that time, data cache logic 320 and prefetch cache logic 340 will determine whether the necessary data reside in their respective caches. If the data is not in one cache or the other, the occurrence of a cache miss (or two cache misses) is communicated to instruction issue unit control logic 160 via DCache miss signal 322 and PCache miss signal 342. If the data is stored in prefetch cache 330, it is communicated to floating point register file 500 via PCache data lines 336. Likewise, if the requisite data is stored in data cache 310, the data is communicated to register file 400 via DCache data lines 312.

To support the method of the present invention, microarchitecture 10 provides a load prediction bit (LPB) as part of the data associated with each instruction stored in instruction cache 120 (e.g., in addition to the pre-decode bits associated with each cached instruction). An LPB indicates to instruction steering unit 150 whether an instruction (specifically in this example, an LDF instruction) should be executed in one of the AX functional units or in MS functional unit 210. As such, an LPB does not proceed to execution with its associated instruction. If an LPB is not used in the execution of the instruction stored in a particular location in instruction cache 120 (i.e., that instruction is not an LDF instruction), the associated LPB is simply ignored. The LPB is stored solely in instruction cache 120 (not in any external memory units) and is initially cleared when an instruction is loaded into instruction cache 120.

While the method of the present invention may be used to distinguish between several types of instructions and the resources they require, it is particularly suited to determining the most appropriate functional unit in which LDF instructions may be executed. Microarchitecture 10 is therefore structured to permit such distinctions. To that end, instruction steering unit 150 controls multiplexer 255, instruction issue unit control logic 160 controls multiplexer 125, and cache miss signals are provided to instruction issue unit control logic 160. This allows instruction issue unit control logic 160, in concert with instruction steering unit 150, to determine where the requisite data is likely to be stored and issue the given LDF instruction appropriately.

Operation of the Exemplary Microarchitecture

Figure 2:
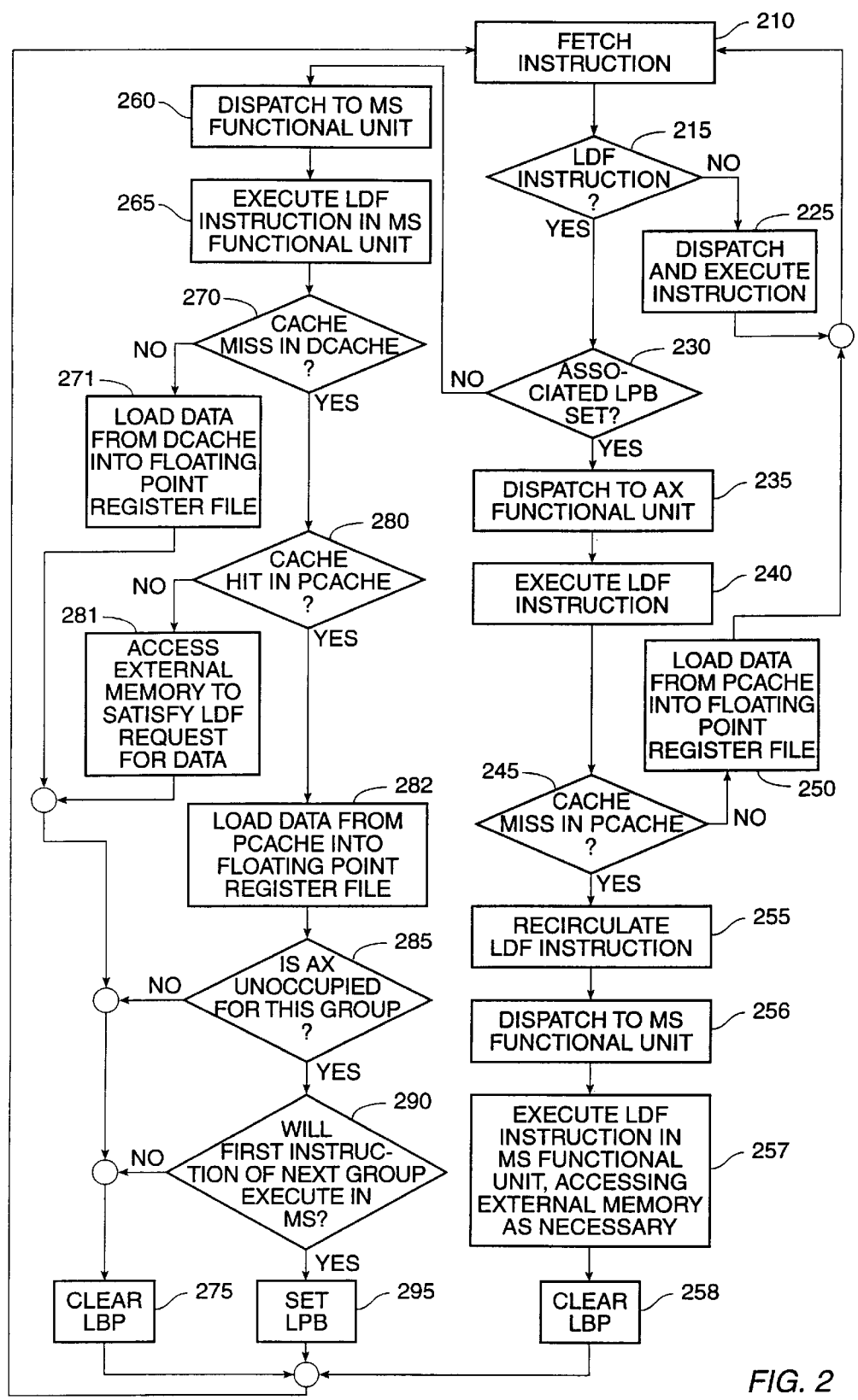
FIG. 2 is a flow diagram showing one embodiment of the method of the present invention.

FIG. 2 illustrates the operation of microarchitecture 10 with regard to the method of the present invention. As before, a microarchitecture such as microarchitecture 10 would capable of executing many different instructions, and each would have its own set of execution steps. As with any instruction decoding process, however, the first step is to fetch the instruction to be executed (step 210). At this time, then, one or more instructions are fetched from instruction cache 120. Not indicated in step 210 are the normal procedures which are performed in cases of cache misses, such as multiple instruction (cache line) fills and the like.

The instruction(s) are loaded into instruction issue queue 130 as part of step 210. The instruction to be executed subsequently passes from instruction issue queue 130 to instruction steering unit 150, which determines if the instruction is an LDF instruction (step 215). If the instruction is not an LDF instruction, execution proceeds with step 225, at which the instruction is issued and executed by the pipeline selected by instruction steering unit 150.

If the instruction is an LDF instruction, instruction steering unit 150 determines whether the associated LPB is set (step 230). If the LPB associated with the current instruction is set, the instruction is issued to AX functional unit 220 (step 235). A0 functional unit 230 and A1 functional unit 240 are treated as a single functional unit (i.e., AX functional unit 220) with regard to LDF instructions due to the structure of microarchitecture 10. This is because, as is illustrated in FIG. 1, prefetch cache 330 supports only a single port (AX port 334) for accesses by the two AX functional units. Thus, AX functional unit 220 may execute only one LDF instruction during any one time slice (i.e., instructions grouped by instruction steering unit 150 may only include one LDF issued to AX functional unit 220). The AX functional units' respective address lines must therefore be multiplexed by multiplexer 255, which selects the appropriate set of address lines (i.e., those belonging to the functional unit executing the LDF instruction) under the control of instruction steering unit 150. In this manner, the proper data address is supplied, via AX address lines 250, to AX port 334 of prefetch cache 330.

Once issued to AX functional unit 220, the LDF instruction is executed at step 240. At step 245, instruction issue unit control logic 160 uses PCache miss signal 342 in concert with instruction steering unit 150 to determine if a cache miss has occurred in prefetch cache 330. If prefetch cache 330 holds the requisite data (i.e., a cache hit occurs), the functional unit involved executes the LDF instruction by causing the data to be copied from prefetch cache 330 to floating point register file 500 via PCache data lines 336 (step 250). In this case, the associated LPB remains unchanged. Should it be determined at step 245 that the data does not reside in prefetch cache 330 (i.e., a cache miss occurs), a recirculation of the LDF instruction to MS functional unit 210 is performed at step 255.

Microarchitecture 10 performs a recirculation under the control of instruction issue control logic 160. Normally, an instruction is fetched from instruction cache 120 when instruction address unit 110 issues an instruction address, assuming an instruction cache hit occurs. The instruction retrieved is provided to instruction issue queue 130 which subsequently communicates the instruction to instruction steering unit 150, which steers the instruction to an appropriate functional unit. Simultaneously, however, a copy of the issued instruction is provided to recirculation queue 140, which stores the instruction until it has been successfully executed.

In the case of an LDF instruction being executed in AX functional unit 220, upon a cache miss in prefetch cache 330, the LDF instruction is canceled and the copy of the LDF instruction held in recirculation queue 140 is passed back to instruction issue queue 130 via multiplexer 125 as part of the recirculation (step 255). At step 256, instruction issue unit control logic 160 then indicates to instruction steering unit 150 that this LDF instruction should now be issued to MS functional unit 210. Alternatively, the canceled LDF instruction may simply be re-fetched from instruction cache 120. Instruction issue unit control logic 160 may also cause the cancellation of instructions younger than the LDF instruction and related thereto.

Microarchitecture 10 recirculates the LDF instruction for two reasons. First, in microarchitecture 10, an LDF instruction issued to AX functional unit 220 only gains access to prefetch cache 330 (and not data cache 310). Thus, an LDF instruction which misses prefetch cache 330 must be issued to MS functional unit 210 to gain access to data cache 310. This is done in the interest of maintaining throughput, because accessing data cache 310 is substantially faster than accessing external memory (e.g., second-level cache, main memory, or otherwise). Second, microarchitecture 10 only supports access to external memory via MS functional unit 210. Thus, if the requisite data cannot be found in either cache, the LDF instruction must be executed in a functional unit capable of accessing external memory.

Next, at step 257, MS functional unit 210 attempts to retrieve the required data from data cache 310 by addressing data cache 310 via MS address lines 212. While this address is also supplied to prefetch cache 330, a cache miss will likely occur because a cache miss in prefetch cache 330 has already occurred in prefetch cache 330 by this point. However, a cache miss may also occur in data cache 310, necessitating an external memory unit access. In any event, the data will ultimately be loaded into floating point register file 500. Depending on the algorithm used by data cache logic 320, the data will also likely be stored in data cache 310 at this point.

Finally, the LPB is cleared at step 258. This indicates that an attempt was made to execute the LDF instruction in AX functional unit 220, but that the requisite data was not present in prefetch cache 330. Thus, the next time this instruction is fetched, it will be issued to MS functional unit 210. The requisite data may then be expected to reside in data cache 310 (because that data will have already been loaded in satisfying the present request). This situation may change, of course, what with the possibility of prefetches into prefetch cache 330, cache line loads into data cache 310, and other such operations.

As can be seen, a fundamental tension exists in microarchitecture 10. Preferably, LDF instructions should execute in AX functional unit 220. This maintains the availability of MS functional unit 210 for instructions which require its special capabilities, which can be a substantial portion of the instruction set of microarchitecture 10, and to improve throughput by increasing parallelism. However, without some way to determine the likelihood of successfully executing an LDF instruction, an excessive number of recirculations may be required. A recirculation is an expensive operation in terms of the number of machine cycles required. By using an LPB to indicate where the requisite data is probably stored, the present invention avoids sending LDF instructions to MS functional unit 210 unnecessarily, maintaining the availability of MS functional unit 210. An LPB of the present invention also avoids LDF instructions being sent to AX functional unit 220 when the likelihood of finding the requisite data in prefetch cache 330 is small, and so avoids the overhead of unnecessary recirculations.

As illustrated in FIG. 2, if the associated LPB is not set (i.e., was cleared), the LDF instruction in question is issued to MS functional unit 210 (step 260) and is executed therein (step 265). Upon execution of the LDF instruction, MS functional unit 210 communicates the address of the requisite data to data cache 310 and prefetch cache 330 via MS address lines 212. MS functional unit 210 always supplies addresses to both data cache 310 and prefetch cache 330 because the requisite data may reside in either of these caches. Of course, the requisite data may reside in neither of these caches. Such a situation would necessitate accessing an external cache unit (not shown) or other architectural memory level. The data so retrieved would then be cached in data cache 310. Additionally, the data may be prefetched into prefetch cache 330, under the control of either software (e.g., the compiler) or hardware (e.g., as part of a cache line fill).

Instruction issue unit control logic 160 always examines both cache miss lines when an LDF instruction is being executed in MS functional unit 210. As illustrated in FIG. 2, if there is a cache hit in data cache 310 (step 270) or a cache miss in prefetch cache 330 (step 280), the LPB will always be cleared (step 275) when the associated LBP was originally cleared. Steps 270 and 280 are performed regardless of where the data is stored when the LDF instruction is first executed, and does not reflect the provision of that data to floating point register file 500 (which will indeed occur at some point).

At step 270, instruction issue control logic 160 determines whether a cache miss has occurred in data cache 310 by examining DCache miss signal 322. If a cache hit occurs in data cache 310, the data in data cache 310 is loaded into the register of floating point register file 500 indicated in the LDF instruction (step 271). The LPB is then cleared (step 275) and processing continues.

If a cache miss occurs in data cache 310 (i.e., the requisite data is not found in data cache 310), instruction issue unit control logic 160 then examines PCache miss signal 342 at step 280 to determine whether a cache miss has occurred in prefetch cache 330. If the requisite data is also not stored in prefetch cache 330 (i.e., a cache miss occurs in prefetch cache 330), an external memory access is performed (step 281). This loads the data into date cache 310, from which it is loaded into the appropriate register in floating point register file 500 (step 281). A cache miss in both caches will require the LDF instruction to be recirculated (or re-fetched). This is done to allow time for the external memory access to complete and to cause the proper regeneration of the control signals (e.g., memory addresses calculated by the execution of the LFD instruction). Again, the LPB is then cleared at step 275. If the data is found in prefetch cache 330, the requisite data is loaded into the appropriate register in floating point register file 500 (step 282).

The scenario leading to step 282 (a cache miss in data cache 310 and a cache hit in prefetch cache 330) could occur in at least two situations. The LDF instruction may have been executed in MS functional unit 210 because MS functional unit 210 was the only functional available in which the LDF instruction could be executed. Alternatively, the LPB associate with the LDF instruction may have been cleared prior to the LDF instruction being issued (e.g., this is the LDF instruction's first execution). If the requisite data was absent from data cache 310 (having not yet been loaded, or having been overwritten), but was prefetched into prefetch cache 330 after the LDF instruction has issued, the data would (incorrectly) be expected to reside in data cache 310 and not in prefetch cache 330.

Alternatively, the LPB may also have been cleared if the LDF instruction was recirculated to MS functional unit 210 (i.e., although the LPB was set and the LDF instruction was executed in AX functional unit 220, the data required by the LDF instruction was not in prefetch cache 330). Aside from the need to execute the LDF instruction in MS functional unit 210 to gain access to the data (either in data cache 310 or in external memory), the flow diagram in FIG. 2 could simply be redrawn in such a case to show the transfer of control from step 255 to step 260. In that case, the LDF instruction would again be executed in MS functional unit 210 and the associated LPB cleared as before. However, PCache miss signal 342 would be re-examined, although a cache miss would again result.

The next two steps in the method shown in FIG. 2 examine grouping characteristics of the groups both containing the LDF instruction and the next sequential group. As previously noted, instructions are grouped to take maximum advantage of the pipelines currently available to maximize throughput. At step 285, instruction issue unit control logic 160, in concert with instruction steering unit 150, determines whether AX functional unit 220 is unoccupied for the group containing the LDF instruction in question. AX functional unit 220 is occupied if instructions in the given group are already scheduled for issue to both A0 functional unit 230 and A1 functional unit 240. This would be the case for a group containing (from Table 1) the ADD instruction (A0), the SUB instruction (A1), and the LDF instruction (MS). If AX functional unit 220 is occupied for this group (i.e., two of the instructions in the group containing the LDF instruction is executed in AX functional unit 220), the LPB is cleared at step 275 and processing continues at step 210 with the fetching of the next instruction(s).

If AX functional unit 220 is not occupied for this group, the next group is examined. At step 290, the first instruction of the next group is examined to determine if it will executed in MS functional unit 210. If this first instruction will not execute in MS functional unit 210, the LPB is cleared at step 275 and the next instruction fetched at step 210. However, if this first instruction will execute in MS functional unit 210, the LPB is set at step 295. Setting the LPB indicates that the associated LDF instruction will be executed in AX functional unit 220, should this LDF instruction again be fetched from instruction cache 120.

The assembly code segment of Table 1 provides a good example of the sequence of conditions which must be successfully met to force the LDF instruction to subsequently execute in AX functional unit 220 (by setting the associated LPB). The instruction stream of Table 2 also represents an exemplary segment of assembly code. This code segment takes advantage of the improved performance microarchitecture 10 enjoys by its use of the present invention:

TABLE 2

Grouping of exemplary assembly code segment.

| Instruction | Functional Unit | Group |
|---|---|---|
| ADD | A0 | 1 |
| SUB | A1 | 1 |
| XOR | A0 | 2 |
| LDI | MS | 2 |
| LDF | MS | 3 |
| STO | MS | 4 |

Assuming that all functional units are available at the start of this code segment, the ADD and SUB instructions will fill AX functional unit 220. Because the XOR instruction must use AX functional unit 220, no further instructions may be included in the group, and so group 1 is complete. Because the XOR uses AX functional unit 220 and the LDI instruction uses MS functional unit 210, they form group 2. The LDF instruction is not included in group 2 because it must also use MS functional unit 210. Because the STO instruction also uses MS functional unit 210, the LDF instruction is placed in its own group, group 3. The STO instruction, while using MS functional unit 210, may actually be part of a larger group (group 4), so long as the immediately subsequent instructions use AX functional unit 220. It can therefore be seen that, in microarchitecture 10, a maximum of three instructions can be in a group. More functional units could be expected to permit larger groups.

In this example, the LDF instruction in Table 2 is executed in MS functional unit 210 on this particular pass through this code segment. This would occur, for example, if this was the first time the LDF instruction was executed since being loaded into instruction cache 120 because associated LPBs are cleared on instruction load. Assuming that the data accessed by the LDF instruction is not found in data cache 310 (cache miss) and is found in prefetch cache 330 (cache hit), the next condition to examine is whether AX functional unit is unoccupied for this group.

Indeed, because the LDF instruction is executed in MS functional unit 210 and is the only instruction in group 3, AX functional unit is completely unoccupied for this group. Next, the first instruction of the next sequential group is examined (here, the STO instruction in group 4). While the other instructions which may be part of group 4 are not shown, they need not be for this analysis. The first instruction of group 4 does indeed execute in MS functional unit 210. These last two conditions permit the LDF instruction to be shifted from MS functional unit 210 to AX functional unit 220, allowing MS functional unit 210 to be used for the first instruction of the next group. In this manner, instructions may be re-grouped to make more efficient use of the functional units. This new grouping is shown in Table 3.

TABLE 3

Revised grouping of exemplary assembly code segment.

| Instruction | Functional Unit | Group |
|---|---|---|
| ADD | A0 | 1 |
| SUB | A1 | 1 |
| XOR | A0 | 2 |
| LDI | MS | 2 |
| LDF | A0 or A1 | 3 |
| STO | MS | 3 |

If the instruction following the STO instruction also used MS functional unit 210, grouping the STO instruction with the LDF instruction would reduce the number of groups executed by one and approximately double the throughput for group 3.

In this example, because the requisite data is not in data cache 310 and is in prefetch cache, the instructions can be successfully regrouped to make more efficient use of the functional units. The LPB is set, forcing the LDF instruction in Table 2 to execute in AX functional unit 220 on the next pass through this code segment. Forcing the LDF instruction to execute in AX functional unit 220 should not cause recirculation in this situation (i.e., no cache miss should occur in prefetch cache 330).

However, this is not a guarantee. Between the first execution of the LDF instruction and its subsequent execution, other data may be prefetched into prefetch cache 330. In all likelihood, though, the data will remain in prefetch cache 330 because such data is normally prefetched for the reason that it will be need to be reused several times. Because allocations are made dynamically, the resource usage shown in Table 2 may not (and in this case, will not) be the same for every pass through the code segment. The present invention therefore allows the dynamic allocation of functional units based on current availability of computing resources.

However, microarchitecture 10 does not perform any lookahead in grouping instructions, so younger instructions which might otherwise alter instruction grouping are not considered. A group is filled sequentially, and no re-ordering is done. Thus, when a group is full, the group is set for that pass through the code, even if a more advantageous grouping exists. For example, the SUB, XOR, and LDI instructions might be advantageously grouped together, assuming the ADD instruction could be placed in the preceding group. However, because the ADD and SUB completely occupy AX functional unit 220, the XOR instruction must be grouped in the following group. This could be addressed by providing lookahead capabilities in instruction steering unit 150 and instruction issue unit control logic 160. Moreover, out-of-order execution, which would also improve grouping, is not provided for in microarchitecture 10, although it could be.

Having fully described the preferred embodiments of the present invention, many other equivalent or alternative methods of implementing load instruction steering according to the present invention will be apparent to those skilled in the art. For example, the method of the present invention is not limited to the microarchitecture illustrated in FIG. 1. Microarchitecture 10 is a load/store architecture, meaning that data must be loaded into a register in the register file prior to any operations being performed on it. However, other architectures may benefit from the present invention. For example, a register/memory architecture, in which data may be operated on while still in memory, could be designed to take advantage of the present invention. Also, many more functional units (e.g., floating point, graphics, and possibly others) would likely be included in microarchitecture 10. Two or more load prediction bits might also be used, depending on the number of functional units from which the appropriate functional unit is selected. Moreover, an LPB might be stored in other levels of a processor's memory hierarchy. Finally, out-of-order execution might be provided for in microarchitecture 10. These equivalents and alternatives, and others, are intended to be included within the scope of the present invention.

What is claimed is:

1. A processor comprising:

a plurality of data memories;

a plurality of functional units, each one of said plurality of functional units being coupled to at least one of said plurality of data memories such that at least one of said plurality of functional units is coupled to each one of said plurality of data memories;

an instruction memory having a plurality of entries, one or more of said plurality of entries configured so as to be able to store at least a load prediction bit and an instruction, wherein said load prediction bit is useable to predict which one of said plurality of data memories contains data accessed by said instruction; and an instruction issue unit, coupled to said each one of said plurality of functional units and said instruction memory, configured to issue said instruction to a one of said plurality of functional units based at least in part on a value of said load prediction bit.

2. The processor of claim 1 wherein said one of said plurality of functional units is coupled to said one of said plurality of data memories.

3. The processor of claim 2 wherein
said instruction issue unit is configured to determine said value of said load prediction bit based on a first probability,
said first probability is a probability of said data being stored in said one of said plurality of data memories,
said second probability is a probability of said data being stored in another one of said plurality of data memories, and
said first probability is greater than or equal to a second probability.

4. The processor of claim 1 wherein said instructions are executed in groups, said instruction issue unit being further configured to alter groupings of instructions in response to said value of said load prediction bit.

5. A processor, the processor configured to execute a first group of instructions and a second group of instructions, the first group of instructions comprising at least an instruction, the second group of instructions comprising at least one instruction, comprising:
a first memory;
a second memory;
a first functional unit, coupled to said first memory, said first functional unit being capable of executing the instruction;
a second functional unit, coupled to said first memory and to said second memory, said second functional unit being capable of executing the instruction;
an instruction issue unit coupled to said first and said second functional units, said instruction issue unit configured to issue the instruction to one of said first and said second functional units, based at least in part on a value of a load prediction bit associated with the instruction, wherein said value of said load prediction bit predicts which one of said first and said second memories contains data accessed by said instruction.

6. The processor of claim 5 wherein said instruction issue unit is configured to
set said load prediction bit, if the data is stored in said first memory, the data is not stored in said second memory, each instruction in the first group of instructions can be executed in said first functional unit, and a particular instruction in said second group of instructions can be executed in said second functional unit, and
clear said load prediction bit, otherwise.

7. The processor of claim 6 wherein said first functional unit is selected if said load prediction bit is set and said second functional unit is selected if said load prediction bit is cleared.

8. The processor of claim 6 wherein said instruction issue unit is configured to alter said first and said second groups of instructions by removing said particular instruction from said second group of instructions and including said particular instruction in said first group of instructions.

9. The processor of claim 5 said instruction issue unit comprising:
an instruction cache, coupled to said instruction address unit, having a plurality of entries, each one of said plurality of entries configured so as to be able to store the instruction and the load prediction bit;
an instruction issue queue coupled to said instruction cache;
an instruction steering unit coupled to said instruction issue queue; and
control logic, coupled to said instruction cache, said instruction issue queue, and said instruction steering unit, and
configured to receive a first and a second cache miss signal from said first and said second memories, respectively, and
configured to
set said load prediction bit, if the data is stored in said first memory, the data is not stored in said second memory, each instruction in the first group of instructions can be executed in said first functional unit, and an particular instruction in said second group of instructions can be executed in said second functional unit, and
clear said load prediction bit, otherwise.

10. The processor of claim 6 wherein said instruction issue unit is configured to
set said load prediction bit, if the data is likely to be stored in said first memory, is not likely to be stored in said second memory, each instruction in the first group of instructions can be executed in said first functional unit, and a particular instruction in said second group of instructions can be executed in said second functional unit, and
clear said load prediction bit, otherwise.

11. The processor of claim 10 wherein said first functional unit is selected if said load prediction bit is set and said second functional unit is selected if said load prediction bit is cleared.

12. The processor of claim 11 wherein said instruction issue unit is configured to alter said first and said second groups of instructions by removing said particular instruction from said second group of instructions and including said particular instruction in said first group of instructions.

13. The processor of claim 10, said instruction issue unit comprising:
an instruction cache, coupled to said instruction address unit, having a plurality of entries, each one of said plurality of entries configured so as to be able to store the instruction and the load prediction bit;
an instruction issue queue coupled to said instruction cache;
an instruction steering unit coupled to said instruction issue queue; and
control logic, coupled to said instruction cache, said instruction issue queue, and said instruction steering unit, and
configured to receive a first and a second cache miss signal from said first and said second memories, respectively, and
configured to determine said value of said load prediction bit.

14. A method for executing an instruction in a processor, the instruction accessing data,
the processor being able to execute a first and a second group of instructions, the first group of instructions including at least the instruction, the second group of instructions including at least one instruction,
the processor having an instruction cache, the instruction cache having a plurality of entries, one or more of said plurality of entries configured so as to be able to store at least the instruction and a load prediction bit associated with the instruction, the processor having a first memory and a second memory, and being coupled to an external memory unit, the processor having a first functional unit and a second functional unit, the first and second functional units being able to execute the instruction, comprising the steps of:

determining if the instruction is of a particular instruction type; and determining if the load prediction bit is set, if the instruction is of said particular instruction type, and, if the load prediction bit is set, executing the instruction in the first functional unit, and, if the load prediction bit is cleared, executing the instruction in the second functional unit, and, if the data is not stored in the second memory unit, and if the data is stored in the first memory unit, and if none of the first plurality of instructions is to be executed in the second functional unit, and if any instruction of the second plurality of instructions can be executed in the second functional unit, setting the load prediction bit, and, otherwise, clearing the load prediction bit.

15. The method of claim 14 wherein the step of executing the instruction in the first functional unit further comprises the steps of:

re-fetching the instruction from the instruction cache;

issuing the instruction to the second functional unit;

executing the instruction in the second functional unit; and clearing the load prediction bit, wherein said steps of re-fetching the instruction, issuing the instruction, executing the instruction, and clearing the load prediction bit are performed only if the data is not stored in the first memory unit.

16. The method of claim 14 wherein the step of executing the instruction in the first functional unit further comprises the steps of:

recirculating the instruction to the second functional unit for execution; and clearing the load prediction bit, wherein said steps of recirculating the instruction and clearing the load prediction bit are performed only if the data is not stored in the first memory unit.

17. The method of claim 16 wherein the step of recirculating the instruction to the second functional unit for execution further comprises the steps of:

issuing the instruction to the second functional unit; and executing the instruction in the second functional unit.

18. The method of claim 14 wherein the step of executing the instruction in the first functional unit further comprises the steps of:

attempting to read the data from the first memory unit; and copying that data from the first memory unit into the register file, if the data is stored in the first memory unit.

19. The method of claim 14 wherein the step of executing the instruction in the second functional unit further comprises the steps of:

attempting to read the data from the second memory unit;

copying that data from the second memory unit into the register file, if the data is stored in the second memory unit; and copying that data from the external memory unit into the register file, if the data is not stored in the second memory unit.

20. A computer system, said computer system comprising:

a bus;

a memory, coupled to said bus; and a processor, coupled to said bus, including a plurality of data memories;

a plurality of functional units, each one of said plurality of functional units being coupled to at least one of said plurality of data memories such that at least one of said plurality of functional units is coupled to each one of said plurality of data memories;

an instruction memory having a plurality of entries, one or more of said plurality of entries configured so as to be able to store at least a load prediction bit and an instruction, wherein said load prediction bit is useable to predict which one of said plurality of data memories contains data accessed by said instruction; and an instruction issue unit, coupled to said each one of said plurality of functional units and said instruction memory, configured to issue said instruction to a one of said plurality of functional units based at least in part on a value of said load prediction bit.

\* \* \* \* \*